United States Patent [19]
Bourbeau

[11] 3,758,841
[45] Sept. 11, 1973

[54] DC TO AC STATIC POWER CONVERTER WITH SHORT CIRCUIT PROTECTION

[75] Inventor: Frank J. Bourbeau, Santa Barbara, Calif.

[73] Assignee: General Motors Corporation, Detroit, Mich.

[22] Filed: Nov. 11, 1971

[21] Appl. No.: 197,862

[52] U.S. Cl. .................. 321/14, 321/18, 321/45 S, 323/22 T, 331/113 A
[51] Int. Cl. ............................................. H02m 1/18
[58] Field of Search .................. 321/2, 14, 18, 45 S; 323/22 T, 96; 331/113 A, 62

[56] References Cited
UNITED STATES PATENTS

| | | | |
|---|---|---|---|
| 2,956,240 | 10/1960 | Englund .............................. | 331/62 |
| 3,161,834 | 12/1964 | Noyes .................................... | 331/62 |
| 3,136,958 | 6/1964 | Murphy ................................. | 331/62 |
| 3,369,195 | 2/1968 | Zollinger et al. ..................... | 331/62 |
| 3,546,626 | 12/1970 | McGhee ................................ | 321/2 |
| 3,478,256 | 11/1969 | Tomota .................................. | 321/2 |
| 3,327,199 | 6/1967 | Gardner et al. ....................... | 321/2 |

FOREIGN PATENTS OR APPLICATIONS
1,114,927  10/1961  Germany ........................ 331/113 A

OTHER PUBLICATIONS
IBM Technical Disclosure Bulletin, "Short Circuit Protection for Transistor Regulator," Vol. 2, No. 4, p. 97, Dec. 1959.
Hewlett-Packard Journal, "The Present Attainments of Adjustable Power Supplies," Vol. 13, No. 11, p. 5, July 1962.

Primary Examiner—Gerald Goldberg
Attorney—E. W. Christen et al.

[57] ABSTRACT

DC voltage is coupled through an active voltage regulator to a voltage inverter to develop a precisely controlled AC output voltage. Feedback from the inverter output supplies requisite operating bias to the regulator only when the inverter develops an output voltage, thus rendering the regulator inoperative in the absence of an output voltage as on the occurrence of a short circuit at the load, thereby affording short circuit protection for the DC to AC converter.

2 Claims, 1 Drawing Figure

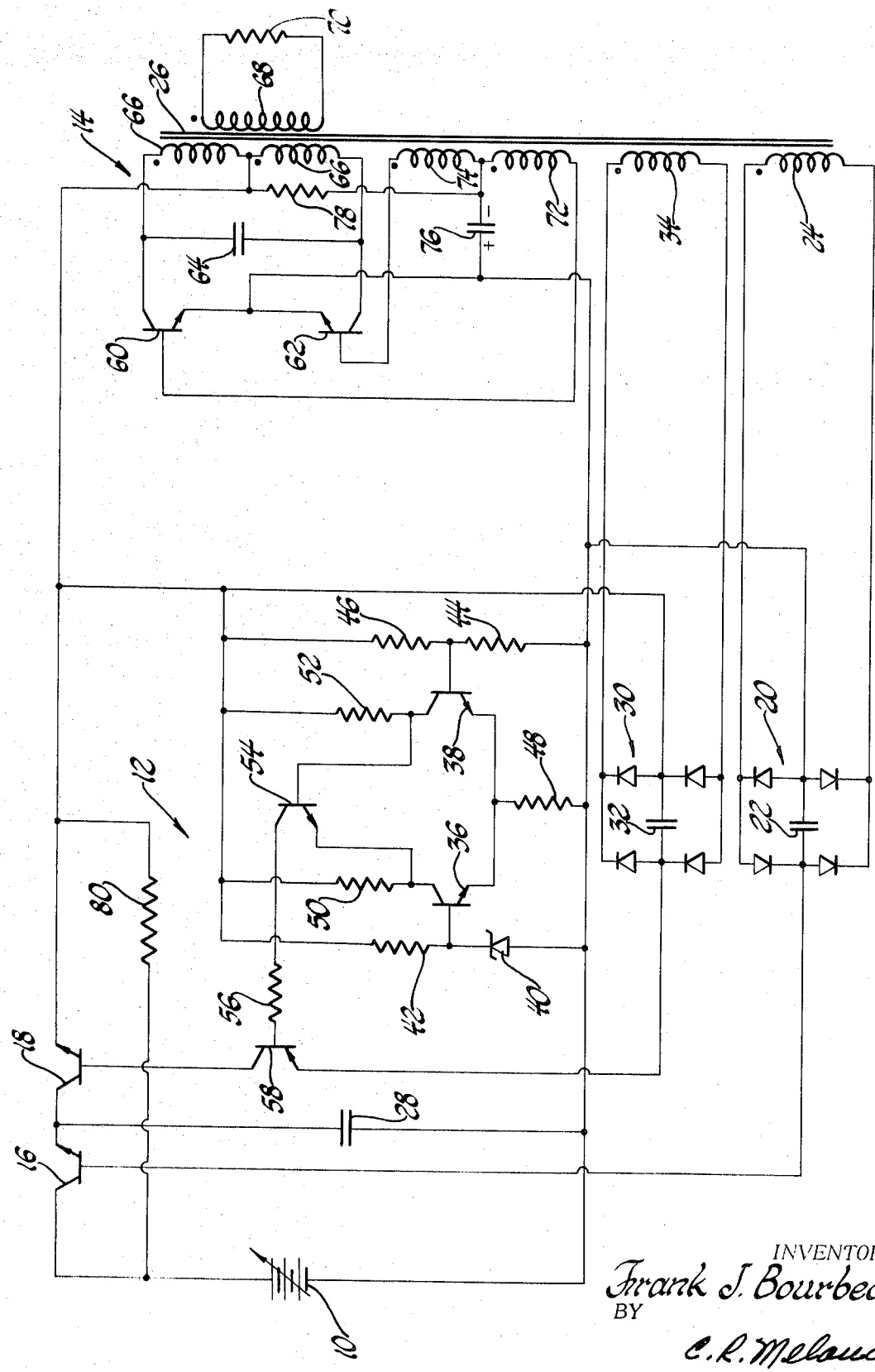

DC TO AC STATIC POWER CONVERTER WITH SHORT CIRCUIT PROTECTION

The invention herein described and claimed was made under a contract or subcontract thereunder with the Department of Defense.

This invention relates to a static electrical system for developing a regulated AC output voltage from a DC input wherein an active voltage regulator is interposed between the input and output and wherein the regulator is provided requisite bias excitation only if output voltage is present, thereby affording short circuit protection.

In certain applications of AC generating systems, it is desirable that the system cease operation on the occurrence of a short circuit at the output load. In the prior art, static voltage inverters requiring short circuit protection have relied on current transformer sensing or other auxiliary protection arrangements to accomplish the desired control.

The instant invention effects voltage regulation and short circuit protection simultaneously by returning the output voltage from the DC to AC converter as a control signal and as a bias excitation signal to an active voltage regulator. In the art of rotating machinery, for example in Raver U.S. Pat. No. 3,271,601, alternator control is known wherein regulation and excitation voltage are simultaneously derived from the output voltage. However, this control for rotating machines differs in operation and is clearly distinguishable from the static control of the present invention. Furthermore, it should be recognized that the approach described in Raver is a common control for a rotating machine; whereas, prior art static converters have invariably adopted a different mode of protection.

In the instant invention, a source of direct voltage is connected through a two-stage regulator with an oscillator. Transformer coupling is used between the oscillator output and a load. Additional windings together with bridge rectifiers are used to develop DC voltages when the oscillator provides an output. These voltages supply requisite bias excitation to both stages of the regulator and in addition, the first regulator stage is supplied a regulation control voltage therefrom to assist in amplitude control of the output. To permit the system to commence operation, a high impedance shunt bypasses the regulator to allow the oscillator to initiate oscillations, thus commencing bias excitation rendering the regulator operative.

Accordingly, it is an object of the present invention to provide a DC to AC converter of the type described wherein both regulation and bias excitation for the regulator are derived from the output, thus limiting the operation of the regulator to those times in which an output voltage is available.

Another object of the present invention is to provide a DC to AC static voltage converter wherein excitation bias voltage for a regulator interposed between a DC input and an inverter is developed from the output voltage, thus rendering the regulator operative when output voltage is available, yet inoperative in the absence of an output voltage as on the occasion of a short circuit.

A further object of the present invention is to provide a converter of the type described wherein transformer coupling is used in conjunction with bridge rectifiers to develop DC voltages when the system has an AC output and wherein the regulator derives requisite excitation bias voltage from these bridge rectifiers such that the regulator is operative when an output is present, yet inoperative on the occurrence of a short circuit at the output load, thus terminating operation at that time.

These and other objects, advantages, and features of the invention will become more readily apparent as reference is had to the accompanying specification and single FIGURE drawing wherein there is shown a DC to AC voltage converter having feedback control according to the concepts of the present invention.

Reference should now be made to the drawing wherein a source of DC voltage 10 provides an input to a two-stage active voltage regulator 12 which develops a precisely regulated DC voltage for an inverter shown as an oscillator 14, thus regulating the voltage level of the AC output from the oscillator 14. The source of direct voltage 10 can take a variety of known forms including a motor driven alternator having full wave rectification to develop DC voltage. In operation, it is expected that the source 10 has a variable voltage level including the possibility of fluctuations from zero voltage to a level substantially greater than the desired regulation voltage level. It should be appreciated that voltage sources of the type described are common and of varied forms. Accordingly, no particular source is shown or described in detail.

In the following description of the DC to AC converter, it is assumed that operation has begun and an AC output is available from the oscillator 14.

The regulator 12 is a two-stage regulator wherein a transistor 16 connected as an emitter follower comprises a preregulator, and a transistor 18, together with its bias control, comprises a post regulator. The source of direct voltage 10 is connected with the input of the preregulator transistor 16 and the voltage developed by the full wave bridge rectifier 20 across the capacitor 22 serves as bias excitation voltage and regulation control for the preregulator. The full wave bridge rectifier 20 is coupled with the output from the oscillator 14 by the winding 24 on the transformer core 26.

As the preregulator transistor 16 is connected in an emitter follower configuration, it should be appreciated that the output voltage developed across the capacitor 28 will follow the feedback voltage from the capacitor 22. In this arrangement, the emitter follower serves as a buffer isolating the source 10 from the capacitor 28 smoothing out fluctuations in voltage at the source 10. It should be recognized that the preregulator is provided positive feedback and that the necessary limitation on the output voltage level is introduced by the post regulator. Of particular importance to the instant invention is the fact that the transistor 16 is provided operating bias excitation by the full wave bridge 20 and capacitor 22 in addition to receiving a reference regulation control therefrom. Without the bias excitation from the capacitor 22, the transistor 16 is nonconductive and the source 10 is isolated from the capacitor 28. This is the effect of a short circuit at the output of the oscillator.

In the post regulator, transistor 18 is supplied a continually varying bias to control the voltage at the input to the oscillator 14. The bias excitation voltage for the transistor 18 is developed by the full wave bridge rectifier 30 across a capacitor 32. A winding 34 on the transformer core 26 supplies the full wave bridge 30.

To control the excitation bias to the transistor 18, a conventional differential amplifier is used. Two transistors 36, 38 are included in the differential amplifier and a voltage difference is developed across the collectors thereof in proportion to the difference between a voltage reference level and the voltage level sensed at the input to the oscillator 14. The reference voltage is developed at the base of transistor 36 across a Zener diode 40 connected through a resistor 42 with the voltage supplied the oscillator 14. A sample of the voltage supplied the oscillator 14 is developed at the base of transistor 38 by the voltage divider comprising resistors 44 and 46. The difference in these base bias voltages is translated into a differential voltage at the output of the amplifier between the collectors of transistors 36 and 38. A common resistor 48 is connected with the emitters of transistors 36 and 38 and two collector resistors 50 and 52 connect the collectors of transistors 36 and 38, respectively, to the voltage supplied the oscillator 14.

A transistor 54 is connected across the output between the collectors of transistors 36 and 38 and is controlled thereby such that there is an increase in collector current in transistor 54 when the base bias to transistor 38 decreases and a decrease in collector current in transistor 54 when the base bias to transistor 38 increases. Thus, the transistor 54 supplies base bias through a resistor 56 to a transistor 58 which increases when the voltage to the oscillator 14 decreases and decreases when the voltage to oscillator 14 increases. The transistor 58 regulates the base bias to the transistor 18 in accordance with the base control supplied to it from the differential amplifier. Accordingly, increased bias is supplied the transistor 18 when the voltage to the oscillator 14 decreases thereby enabling transistor 18 to increase the voltage supplied the oscillator 14. And, in a similar fashion, the transistor 18 is controlled to reduce the voltage to the oscillator 14 when the voltage to the oscillator is excessive. For the present invention, it is particularly important to recognize that the bias excitation for the transistor 18 is supplied by the capacitor 32 connected across the bridge rectifier 30 and supplied by the winding 34. In particular, it should be understood that the failure of the oscillator 14 to develop an output voltage will cause the post regulator to terminate conduction, thus shutting off the converter.

Regarding the oscillator 14, it should be appreciated that a conventional design is used wherein two transistors 60 and 62 cooperate in push-pull fashion to develop an AC output across the parallel resonant tank comprising a capacitor 64 and an inductance 66. The inductance 66 serves as a primary winding on the transformer core 26 coupling the output with a secondary winding 68 connected to a load represented as a resistor 70. Additionally, of course, the primary winding on the transformer develops the requisite excitation for the feedback control through the windings 24 and 34.

Two feedback windings are shown in the oscillator 14 for the transistors 60 and 62; a first winding 72 provides feedback for transistor 60 and a second winding 74 provides feedback to the transistor 62. A common capacitor 76 is connected between the emitters of both transistors 60 and 62 and the juncture of windings 72 and 74. A resistor 78 connects the center tap of the primary winding 66 with the juncture of windings 72 and 74. The center tap of winding 66 is connected with the input voltage from the two-stage regulator and accordingly, this input voltage is connected with the capacitor 76 through the resistor 78. The resistor 78 tends to charge the capacitor 76 according to the polarity of the input voltage to the oscillator 14; however, the capacitor 76 is charged with the opposite polarity in the course of providing bias current to both transistors 60 and 62 during operation of the oscillator. In particular, it should be appreciated that the oscillator is of class C type and that the capacitor is charged with the polarity indicated in the drawing reverse biasing both transistors except for those intervals in which the coils 72 and 74 provide bias exceeding the charge on the capacitor, thereby supplying base current to the respective transistors. It should be understood that this current tends to increase the charge of the capacitor with the indicated polarity. However, the effects of the resistors 78 counteract this tendency and an equilibrium charge is established.

In the foregoing, it was assumed that the operation of the oscillator 14 had commenced and was ongoing. In view of the description, it should be apparent that in the absence of an output voltage from the oscillator 14, neither the preregulator nor the post regulator will permit voltage to be coupled from the source 10 to the oscillator 14. In the instant invention, this is the desired effect to ensure that the system operation is terminated on the occurrence of a short circuit at the output. However, it is necessary to include auxiliary starting means to initiate system operation. This auxiliary starting can be provided in a variety of ways as by a high impedance shunt bypassing both the transistors 16 and 18. In the drawing, such a shunt is shown as a resistor 80. It should be appreciated that the resistor 80 is capable of initiating operation by the oscillator 14 but that the operation is limited to a low level until the feedback control loops supplying bias excitation to transistors 16 and 18 assume control of the voltage supply from the source 10. This low level operation does not detract from the objective of short circuit protection, and it would, as noted, be possible to incorporate other auxiliary starting circuits instead of the resistor 80.

Although the foregoing has proceeded in terms of a specific embodiment, it should be understood that various changes and modifications could be engrafted thereon within the spirit and scope of the appended claims.

I claim:

1. A voltage regulated electrical system having short-circuit protection comprising, a source of direct voltage, an inverter having AC output terminals and direct voltage input terminals, voltage regulating means comprising a transistor having an emitter, collector and base, the conductance of said transistor between its collector and emitter being a function of the magnitude of direct voltage applied to its emitter and base, a circuit connecting said source of direct voltage and said direct voltage input terminals of said inverter including in a series connection the collector and emitter of said transistor whereby the voltage applied to the direct voltage input terminals of said inverter is a function of the conductance of said transistor between its collector and emitter, rectifier means coupled to the AC output terminals of said inverter having direct current output terminals, an energizing circuit for said voltage regulating means connected across said direct current output terminals of said rectifier means including in a series connection the emitter and base of said transistor whereby the magnitude of direct voltage applied to said emitter and base of said transistor from said rectifier means is a function of the output voltage of said inverter, said transistor being biased to a substantially nonconductive condition between its collector and emitter when the voltage at the direct current output terminals of said rectifier means is reduced to thereby provide short-circuit protection for said system, variable impedance means connected in series in said energizing circuit for controlling the voltage applied to the emitter and base of said transistor to thereby control the conduction of said transistor between its collector and emitter, voltage sensing means connected across said direct voltage input terminals of said inverter, and means coupling said voltage sensing means and said variable impedance means operative to control said variable impedance means as a function of inverter input voltage.

2. A voltage regulated electrical system having short-circuit protection comprising, a source of direct voltage, an inverter having AC output terminals and direct voltage input terminals, voltage regulating means including a first transistor having an emitter, collector and base, a power input circuit connecting said source of direct voltage and said direct voltage input terminals of said inverter including in a series connection the collector and emitter of said first transistor, rectifier means coupled to the AC output terminals of said inverter and having direct current output terminals, a second transistor having an emitter, collector and base, an energizing circuit for said voltage regulating means connected across said direct current output terminals of said rectifier means including in a series connection the base and emitter of said first transistor and the emitter and collector of said second transistor, the direct voltage output of said rectifier means biasing the base and emitter of said first transistor conductive when said rectifier means has an output voltage and operative to bias said first transistor substantially nonconductive when said rectifier means has no output voltage to thereby provide short-circuit protection for said system, and means connected across said direct voltage input terminals of said inverter and coupled to the base of said second transistor for controlling the conductivity of said second transistor between its emitter and collector as a function of the direct voltage input to said inverter.

* * * * *